United States Patent [19]
Panzeri

[11] 3,857,280
[45] Dec. 31, 1974

[54] EXTENSIOMETRIC TORQUE METER FOR MEASURING SMALL TORQUES

[75] Inventor: Cesare Panzeri, Macherio, Italy

[73] Assignee: Consiglio Nazionale Delle Ricerche, Rome, Italy

[22] Filed: June 18, 1973

[21] Appl. No.: 371,020

[30] Foreign Application Priority Data
June 22, 1972  Italy.................................. 69018/72

[52] U.S. Cl........... 73/136 A, 339/5 L, 339/118 RY
[51] Int. Cl. .............................................. G01l 3/10
[58] Field of Search .......... 73/136 A, 136 B, 136 C; 339/118 RY, 5 L, 8 L; 310/232

[56] References Cited
UNITED STATES PATENTS
2,889,531  6/1959  Ellerman et al. ................ 310/232 X FOREIGN PATENTS OR APPLICATIONS
439,790  12/1967  Switzerland...................... 73/136 A
441,462  1/1968  Switzerland.................. 339/118 RY
1,122,742  1/1962  Germany .......................... 73/136 A
1,161,053  1/1964  Germany .......................... 73/136 A Primary Examiner—Charles A. Ruehl
Attorney, Agent, or Firm—Sughrue, Rothwell, Mion, Zinn & MacPeak

[57] ABSTRACT

An extensometric torque meter for measuring small torques up to 10 kg. cm. has a shaft to which the torque to be measured is applied, the torque being deduced from the outputs of four strain gauge extensometric elements attached to the shaft. This invention provides improved electrical connections between the extensometric elements and a measuring bridge circuit consisting of contact rings carried by and insulated from the shaft, and connected to the elements, and a stator enclosing the rings and making contact therewith through internal grooves filled with mercury.

12 Claims, 4 Drawing Figures

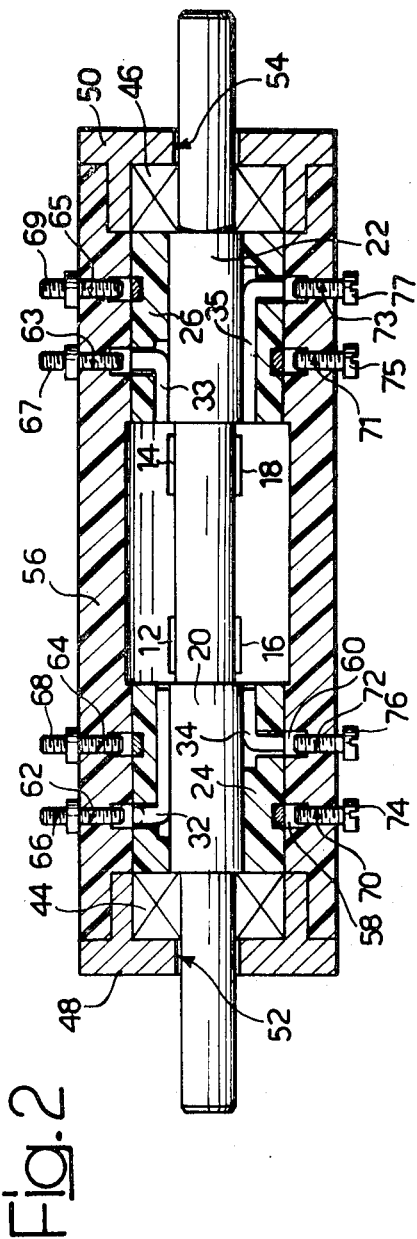
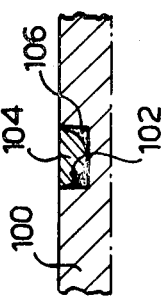
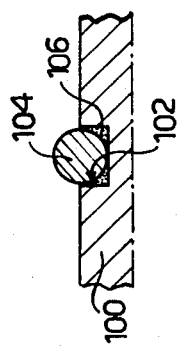

EXTENSIOMETRIC TORQUE METER FOR MEASURING SMALL TORQUES

The present invention relates to an extensometric torque meter, particularly for measuring small torques up to 10 Kg. cm.

The invention was realized within the scope of a research contract between the Program of Research on the Automation of Mechanical Industry with special reference to Machine Tools of C.N.R. and the Experimental Laboratory for Machine Tools of Cinisello Balsamo.

In known extensometric torque meters suitable for measuring small torques the torque to be measured is applied to the ends of a torque shaft.

Such known extensometric torque meters, however, have sliding brush contacts for connection to external measuring circuits. In particular, when small torques, generating small electric signals, have to be measured, sliding brush contacts are inadequate on account of their high and variable resistance. Moreover, such sliding brush contacts are rapidly worn out.

An object of the present invention is the provision of an extensometric torque meter for measuring small torques, in which the drawbacks associated with the high and variable resistance of the contacts of previously known torque meters are avoided.

Another object of the present invention is the provision of an extensometric torque meter of the above-mentioned type, having a low manufacturing cost.

According to the present invention there is provided an extensometric torque meter for measuring small torques, comprising a rotatable shaft which in use of the meter is subjected to the torque to be measured, four extensometric elements attached in symmetrical positions to the surface of the shaft, and electrical connection means for connecting the extensometric elements to an external bridge-measuring circuit, wherein the improvement consists in said connection means comprising:
a. at least one electrically insulating sleeve attached to said shaft;
b. four contact rings embedded in the external surface of said at least one sleeve, each said contact ring having an outside annular contact surface which is flush with the outside surface of the respective sleeve; said rings being connected to respective said extensometric elements;
c. a tubular insulating stator surrounding said at least one sleeve with a sliding fit, said stator being provided with four annular grooves on its internal surface opposite to said contact rings, each said groove being filled with mercury, and
d. conductor means extending through the wall of said stator and into respective said annular grooves, said conductor means being connectible to said external measuring circuit.

The invention will now be described, by way of example, with reference to the accompanying drawings, in which:

FIG. 2 is an axial sectional view of the torque meter of FIG. 1, and FIGS. 3 and 4 are sectional views illustrating details of the torque meter shown in FIG. 1.

Figure 1:
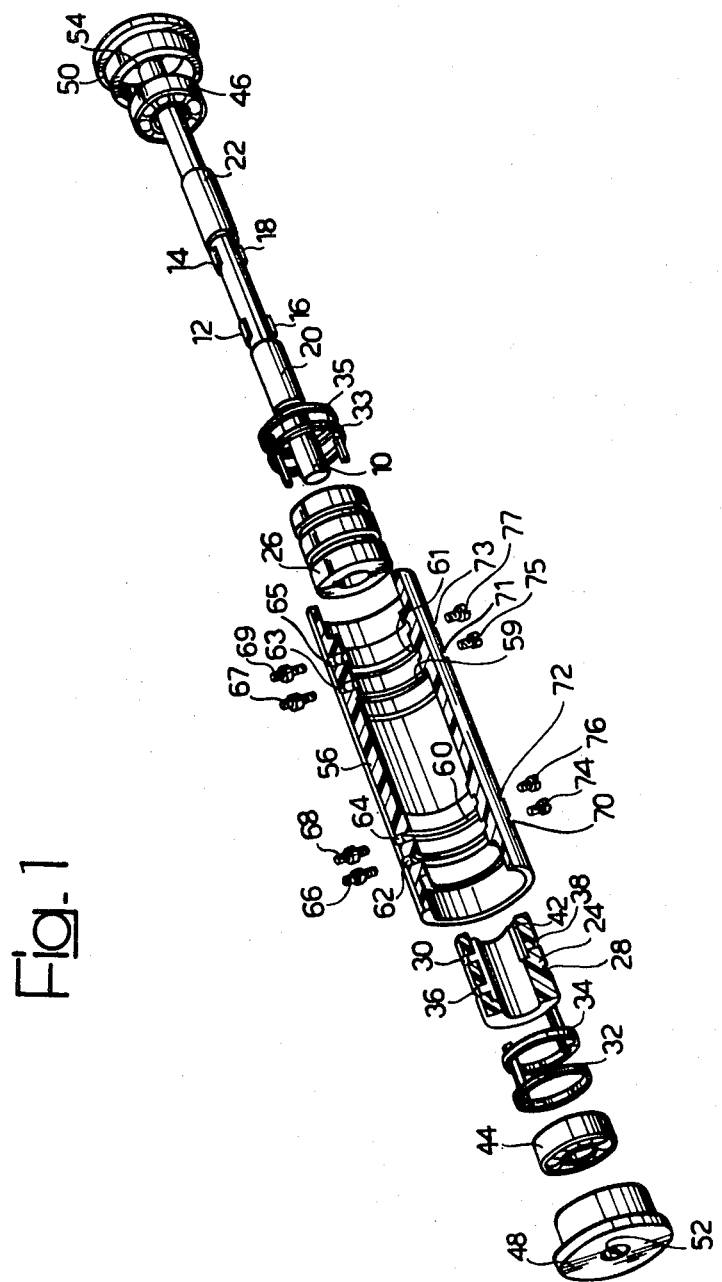
FIG. 1 is an exploded perspective view of a torque meter according to one embodiment of the invention.

With reference to FIG. 1, a low inertia shaft 10 of an elastic material such as steel bears four strain gauges in the form of extensometric plate elements 12, 14, 16 and 18, bridge-connected in a known way in order to counterbalance the effects of flexure and of traction on the shaft as well as the effects of temperature on the plate elements, so as to obtain an electrical signal from the extensometric bridge which is exclusively dependent on the torsional strain caused in the shaft 10 by the applied torque. Two sleeves 24, 26 of a suitable plastics material, preferably methyl polymethacrylate, are attached, for example by glue, to the shaft 10 on two portions 20 and 22 of enlarged diameter.

The two sleeves 24, 26 are identical. The sleeve 24 will be described by way of example. The sleeve 24 has two external circumferential grooves 28, 30 in which two nickel contact rings 32, 34 are located. The rings 32, 34 are formed by bending nickel wires into the respective grooves, the ends of the wires passing through respective radial holes 36, 38 in the wall of the sleeve and extending longitudinally along the inside surface of the sleeve in respective longitudinal slots 40, 42. The longitudinally extending portions of the respective wires are connected to the plate elements 12, 14, 16 and 18 to interconnect the latter in the extensometric bridge.

The ends of the shaft 10 are supported by respective bearings 44, 46, which can be miniature bearings with continuous lubrication, the bearings 44, 46 being in turn, supported in corresponding cylindrical bores in respective caps 48, 50. The end walls of the caps 48, 50 have respective central holes 52, 54 through which the ends of the shaft 10 pass. The caps 48 and 50 are inserted and glued into the ends of a hollow cylindrical stator 56 of insulating material, preferably methyl polymethacrylate, which stator 56 surrounds the shaft 10 and the sleeves 24 and 26 and interconnects the caps 48 and 50.

The inside surface of the stator 56 is provided with four annular grooves 58, 60 and 59, 61 which are filled with mercury when the shaft 10 and sleeve 24, 26 have been assembled inside the stator 56. Radial holes 62, 64 and 63, 65 are made in the wall of stator 56 in correspondence with the respective grooves 58, 60 and 59, 61, and respective nickel contact terminals 66, 68 and 67, 69 are inserted in these holes for connecting the extensometric bridge 12, 14, 16, 18, through the nickel rings 32, 34 and 33, 35 and the mercury contained in the grooves 58, 60 and 59, 61 with the external bridge measuring circuit.

Further radial holes 70, 72 and 71, 73 in the wall of the stator 56 allow the filling of the grooves 58, 60 and 59, 61 with mercury after assembly of the torque meter. Plugs 74, 76 and 75, 77 are used to close the filling holes.

The outer surfaces of sleeves 24 and 26 and the inside surface of the stator 56 in the vicinity of the grooves 58, 60 and 59, 61 are machined very accurately, for example ground, with dimensions allowing a sliding fit between said surfaces.

The use of methyl polymethacrylate for the sleeves 24, 26 and the stator 56 is very convenient since this material, besides being a very good dielectric material with a relative dielectric constant of 3.5 – 4.5, is also chemically inert with regard to mercury. Alternatively, materials such as an anodized aluminium alloy or ceramic steel may be used, which are sufficiently dielectric and are not susceptible to contamination by mercury; from this point of view, the embodiment appears to be better with regard to precision (sealing), with regard to rigidity and to dimensional stability in time, and with regard to stability against thermal expansion. in practice, any material with a surface coating of synthetic resin material can be used, for example anodized aluminium alloy with an alkyd-melaminic varnish applied by electrophoresis.

The nickel (purity 99 percent) used for the contact rings 32, 34 is not amalgamated by mercury.

With reference to FIGS. 3 and 4, the preferred machining procedure for the sleeves 24, 26 will now be described.

After obtaining by turning the cylindrical insulating body of each sleeve 24, 26 with the grooves, for example the grooves 28, 30 in the sleeve 24, a cylindrical nickel wire of suitable diameter is glued into each groove. This is illustrated in FIG. 3, where reference 100 indicates a surface part of one of the sleeves, in the region of a groove 102, in which a nickel wire 104 is glued to the walls and to the bottom of the groove 102 by means of a suitable glue 106.

After assembling the semimachined sleeves 24, 26 thus obtained on the shaft 10, the sleeves are ground externally in order to make the nickel contact rings flush with the external surface of the respective sleeve, as shown in FIG. 4, where the outer surface of the nickel wire 104 has been ground level with the adjacent insulating external surface of the sleeve.

The torque meter with mercury contacts, according to this invention, does not require a fluid-tight sliding seal between the sleeves 24, 26 and the stator 56: the various grooves are insulated from each other by allowing a radial clearance of 0.03 mm between each sleeve 24, 26 and the stator 56. At low rotational speeds of the shaft 10 the surface tension of the mercury prevents loss of mercury from the grooves, while at high speeds the centrifugal force acting on the mercury forces the mercury radially outwardly in the respective grooves, effectively sealing the grooves.

The above-mentioned features of the torque meter and, in particular, the use of a solid shaft of small diameter and, therefore, of low inertia, together with the fact that mercury contacts are incorporated, make the torque meter according to the present invention suitable for measuring both static and transient torques, especially small torques in the range 0 to 10 kg.cm.

The extensometric-bridge construction provides compensation for the effects of flexure, traction and temperature.

The supply voltage in the illustrated example is about 5 volts, the maximum rotational speed of the shaft being 6,000 rpm or more.

The extensometric elements or strain gauges can be of the semiconductor type. By using photo-engraved extensometric elements a higher degree of precision can be achieved.

I claim:

1. An extensometric torque meter for measuring small torques, comprising a rotatable shaft which in use of the meter is subjected to the torque to be measured, four extensometric elements attached in symmetrical positions to the surface of the shaft, and electrical connection means for connecting the extensometric elements to an external bridge measuring circuit, said connection means comprising:
   a. two electrically insulating sleeves attached to said shaft on opposite sides of said extensometric elements;
   b. two contact rings embedded in the external surface of each of said sleeves, each said contact rings having an outside annular contact surface which is flush with the outside surface of the respective sleeve, each of said rings being connected to a respective one of said extensometric elements;
   c. a tubular insulating stator surroundingg said sleeves with a sliding fit, said stator being provided with four annular grooves on its internal surface opposite to said contact rings, each of said grooves being filled with mercury, and
   d. conductor means extending through the wall of said stator and into respective annular grooves, said conductor means being connectible to said external measuring circuit.

2. Extensometric torque meter as defined in claim 1, wherein said two sleeves are symmetrical with respect to a transverse plane of said shaft.

3. Extensometric torque meter as defined in claim 1, wherein said contact rings are comprised of nickel.

4. Extensometric torque meter as defined in claim 1, wherein said stator and said sleeves are made of methyl polymethacrylate.

5. Extensometric torque meter as defined in claim 1, wherein the opposed parts of the internal surface of the stator, and the external surface of said sleeves in the vicinity of the contact rings, are ground.

6. Extensometric torque meter as defined in claim 5, wherein the radial clearance between said surface parts is of the order of 0.003 mm.

7. Extensometric torque meter as defined in claim 1, including bearings supported by said stator, said bearings rotatably supporting said shaft.

8. Extensometric torque meter as defined in claim 1, wherein said extensometric elements comprise semiconductor material.

9. Extensometric torque meter as defined in claim 1, wherein said extensometric elements are photoengraved.

10. Extensometric torque meter as defined in claim 1, wherein said stator and said sleeves are made of an anodized aluminium alloy.

11. Extensometric torque meter as defined in claim 1, wherein said stator and said sleeves are made of ceramic steel.

12. Extensometric torque meter as defined in claim 1, wherein said stator and said sleeves are coated with a varnish of plastics material, applied by electrophoresis.

* * * * *